Figure 1:
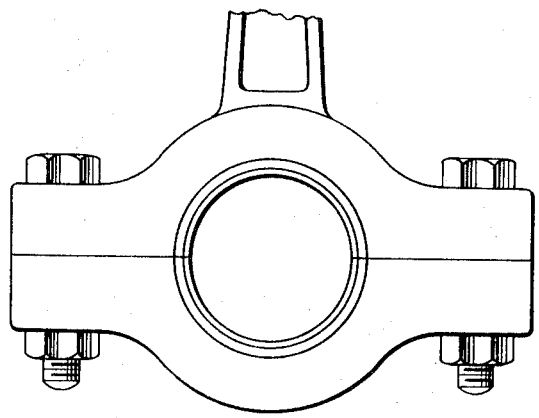

United States Patent
Brown et al.

[15] 3,658,488
[45] Apr. 25, 1972

[54] ELECTRODEPOSITED PLAIN BEARING LINERS

[72] Inventors: Henry Brown, Huntington Woods; Thaddeus W. Tomaszewski, Dearborn, both of Mich.

[73] Assignee: Udylite Corporation, Warren, Mich.

[22] Filed: July 27, 1970

[21] Appl. No.: 58,322

[52] U.S. Cl. ..................................................29/195
[51] Int. Cl. ...............................................B32b 15/00
[58] Field of Search..............29/195 P, 195 R, 195 X, 195 Y

[56] References Cited

UNITED STATES PATENTS

| | | |
|---|---|---|
| 2,691,814 | 10/1954 | Tait.................................29/195 X |
| 3,218,255 | 11/1965 | Pratt................................29/195 X |
| 3,356,467 | 12/1967 | Brown..............................29/195 X |

Primary Examiner—L. Dewayne Rutledge
Assistant Examiner—E. L. Weise
Attorney—Stanley H. Lieberstein and William J. Schram

[57] ABSTRACT

A method for the manufacture of bearing metal liners, such as those suitable for connecting rod and main bearings, which comprises the electrodeposition of a composite electroplate of one or more of the metals of the group consisting of copper, nickel, cobalt, iron or their alloys containing densely codeposited fine non-metallic insulator particles, followed by a thin electroplate of copper, silver, nickel, cobalt, iron or their alloys that will have dense vertical porosity by virtue of having been deposited on the metallic surface containing the densely codeposited non-metallic insulator particles. The highly porous plate is then overlaid with a final lead-tin alloy electrodeposit, which by plating into the dense porosity of the underlying metal, produces in effect a copper-lead; a nickel-lead; a cobalt-lead; a silver-lead; or the like "alloy" plate with an overlayer of lead alloy plate.

16 Claims, 4 Drawing Figures

Patented April 25, 1972 3,658,488

ELECTRODEPOSITED PLAIN BEARING LINERS

This invention relates to the formation by electrodeposition of new and novel thin composite bearing material to be used in sleeve bearings, thrust washers, wear plates and the like. More particularly it relates to the production by electrodeposition of of novel thin composite metal layers to be used as bearing material especially in thin walled shell type bearings and in half-round steel backed shell type precision sleeve bearings such as those used for the connecting rod and main bearings of internal combustion engines. The term bearing material or bearing liners, as used herein, refers to plain bearings which are used where a load is transmitted between moving parts (one with respect to another) by sliding contact without the use of ball or roller bearings.

At the present time steel backed precision interchangeable inserts in both connecting rod and main bearing positions are standard. Such inserts are manufactured from bimetal strip stock produced in a continuous cladding operation. The present bearing materials can be broadly classified into three families: tin- or lead-based bibbitt alloys, copper-lead alloys, and aluminum alloys.

The babbitt metals do not require an overlay electroplate of a lead-tin alloy as this is similar to the babbitt metal, but the higher strength copper-lead alloys (with lead less than about 30 percent) and the higher strength aluminum alloys (with tin less than about 10 percent) need an overlay electroplate of lead-tin alloy for purposes of wear-in, maximum anti-seizing properties, high score resistance and embeddability of dust, and for the most uniform performance. That is, for high quality and over-all excellent performance the high strength bearing materials are very materially improved by the final overlay electroplate of a lead-tin alloy. The lead-tin alloy overlay electroplate is usually about 0.5 to 1 mil in thickness. Its usual composition is approximately 90 percent lead–10 percent tin, or about 90 lead–8 tin–2 copper, with copper in general less than about 3 percent and tin usually not higher than about 10 percent.

It is an object of this invention to provide a novel method to obtain by electrodeposition thin high strength bearing liners similar to copper-lead "alloys".

Another object of this invention to provide an unusual method to economically produce a precision thicknesses various thin composite "alloy" bearing materials such as copper-lead, nickel-lead, brass-lead by electrodeposition.

A further object is to provide greater flexibility and economy in the manufacture of high quality, high strength thin walled bearing materials by providing new electroplated composites and new sequences of electroplated materials and bearings incorporating these new composites on strong metal backings, especially thin walled steel or aluminum backing or on bimetal strip or the like.

These and other objects will become apparent to those in the art from the description of the invention which follows.

Pursuant to the above objects, the bearing liners of this invention contain a novel thin electrodeposit of relatively high strength metal plate, for example, copper, nickel, iron, cobalt, brass, silver or their alloys containing multitudinous very fine vertical pores indirectly obtained by plating on top of an electrodeposit of copper, nickel, cobalt, silver, iron or their alloys containing densely codeposited fine non-metallic particles in the matrix of the metal and on the surface of the plate. This relatively high strength plate (as distinguished from babbitt metal and lead-tin alloy electroplate) containing the dense vertical fine pores is desirably electrodeposited in thicknesses of less than about 0.5 mil and preferably in thicknesses of about 0.1 to about 0.3 mil. Thereafter the finely porous electrodeposit is plated with the final overlay lead-tin or lead-tin-copper alloy plate of, desirably, about 0.5 to 1 mil thickness. These essentially lead-tin alloy plates tend to throw into the fine pores of the underlying plate by geometrical leveling (aided by addition agents such as lignin sulfonic acid, coumarin, hydroquinone, etc. added to the lead alloy plating bath), forming in this manner a copper-lead "alloy", a nickel-lead "alloy", a silver-lead "alloy" plate, or the like, depending on the type of porous metal underneath the final lead-tin alloy plate.

Copper and nickel electroplates containing the densely codeposited fine non-metallic particles are in general the preferred first layer of the duplex plate. Iron or cobalt can be used instead of nickel as well as binary and ternary alloys of all of these metals. Copper, nickel and cobalt can be electroplated from baths that are the easiest to control, and thus are generally preferred even though iron is cheap. Although cobalt plating is about as easy to control as nickel, the metal is more expensive. Accordingly, in the description which follows, codeposition of the non-metallic particles with nickel and copper plate will be emphasized for the reasons given above.

As already mentioned, the use of an electrodeposited lead-tin alloy plate or a cast babbitt metal film as a final overlay for a bearing surface is old in the art (see W. H. Bagley U.S. Pat. No. 2,316,119; and "Electrodeposition in Plain Bearing Manufacture" by P. G. Forrester, Transaction of the Institute of Metal Finishing (London), 1961, vol. 38, pp 52–58; "Electroplating in the Sleeve-Bearing Industry" by R. A. Schaefer, National Bureau of Standards Circular 529 (Electrodeposition Research), May 22, 1953, pp 57–62.

The principle of this invention may be carried out in a number of ways. One way, using equipment common to many operations already in use in sleeve bearing manufacture, is described hereafter. Although in this description, sleeve bearing manufacture is emphasized, the electroplates themselves can also be used in thrust bearings, wear plates, and the like.

A steel backing strip may be cladded with a suitable layer, e.g., of about 5 to about 25 mils thickness, of aluminum, aluminum alloy, copper or copper alloy. The steel backing may have a preliminary coating of a thin film of, for example, nickel or copper to secure maximum adhesion of this layer to the steel backing when the strip is subjected to the hot rolling step. The nickel film can be applied by electrodepositing a thin nickel strike, and can be used in many cases for securing maximum adhesion of, for example, aluminum alloy strip to the steel strip. A thin copper or nickel film on the steel can be used to secure maximum adhesion of a copper, brass or other copper alloy strip or layer to the steel strip. After hot rolling, the resulting essentially bimetal strip is cut into proper size blanks which are then formed into half shells and machined and broached to a final size, which, desirably is undersized, e.g. from about 1 mil to about 1.5 mils undersized, to allow for the precision electrodeposition of the novel duplex contiguous electroplates of this invention and the final lead-tin alloy overlay plate. The novel duplex electroplate of this invention comprised of copper, nickel, cobalt, iron or their alloys containing multitudinously codeposited non-metallic particles, such as barium sulfate, strontium sulfate, talc, mica, Saran, PVC, Teflon, Kel-F, polyethylene acetal resin particles, or the like, can be codeposited either as a single plate or a multiple plate with a single type of particle, such as barium sulfate along, or as mixtures such as barium sulfate particles codeposited with strontium sulfate or with Teflon, acetal resin, or Saran particles. The co-deposition of the fine non-metallic particles is accomplished by dispersing the fine particles in the plating baths, as with air agitation as described in U.S. Pat. Nos. 3,152,971-2-3, 3,268,307-8, 3,268,423-4, 3,311,548, 3,356,467. These composite plates need be only about 0.1 mil to about 0.5 mil thick, though they may even be made 1 to 2 mils thick, as for example, where the steel backing is plated directly. Where, however, the underlying metal layer on the steel backing is at least about 1 to 5 mils thick, there generally will be no need for a thickness greater than about 0.2 to about 0.5 mil of the electroplated layer of copper or nickel containing the densely codeposited fine non-metallic particles. Typically, a layer of 0.1 to about 0.3 mil is all that is usually necessary to obtain densely codeposited fine non-metallic particles, especially of barium sulfate, strontium sulfate, Saran or PVC.

After the composite electroplate comprising nickel or copper containing densely codeposited non-metallic particles is deposited, a thin coating of silver, brass, nickel, cobalt or iron, or their alloys, is electroplated, with nickel generally being preferred. This thin nickel, cobalt, brass or silver layer, or multiple thin layers of nickel followed by cobalt or silver or brass, preferably about 0.1 to about 0.2 mil thick, is followed by the well-known final overlay of lead-tin alloy electroplate of a thickness of about 0.2 to about 1 mil, preferably 0.5 to about 1 mil. Although the use of codeposited fine non-metallic particles in the thin nickel or silver or brass or cobalt plate preceding the final lead-tin alloy plate may be beneficial, it is not essential, whereas the presence of densely codeposited fine non-metallic particles in the underlayer to the densely porous thin plate of nickel, brass, or the like, is essential to cause the dense, vertical, fine porosity of this thin plate and still have a high strength film.

The final overlay lead-tin alloy plate not only has good atomic bonding to the underlayer but also has additional mechanical bonding by anchoring in the dense fine vertical porosity of the nickel, cobalt, silver or brass underplate. There are thus present conditions for maximum bonding qualities, and since at the bottom of the vertical pores there are entrapped fine non-metallic particles, there is minimal danger of tin diffusing with time from the lead-tin alloy plate into an underneath copper or aluminum layer. This danger is even more minimal if the underneath layer is nickel, cobalt or iron containing the densely codeposited non-metallic particles. This is advantageous since it is known that if most of the tin diffuses out of the lead-tin alloy plate, the remaining lead plate will tend to be attacked by any organic acids present in the lubricating oils.

No matching operations are needed for the consecutive electrodeposited layers, as precision plating (see U.S. Pat. No. 2,697,690 Dec. 21, 1954 and British Pat. No. 1,056,723 Jan. 25, 1967 on box type plating racks for shell bearings) of the concave side is done to a final finished size, with the total thickness of the electroplated layers for half-round sleeve bearings usually comprising about 1.5 mils of electroplate with about 1 mil of the layers being the final lead-tin alloy plate. It is important to emphasize that the thin high strength plate or combination of thin plates, with the dense vertical fine porosity that underlies the final lead-tin alloy overlay plate, is desirably not appreciably above about 0.3 mil thick to ensure that the porosity isn't closed up by the geometrical leveling tendency of the nickel, cobalt, iron, silver or brass baths, or by the leveling tendency of addition agents such as coumarin in nickel and nickel alloy plates, or of fine non-metallic powders in all of these baths. This leveling tendency is, however, found to be less in the alkaline silver and brass plating baths. In general, it is preferred to use about 0.1 mil to about 0.2 mil of the relatively high strength plate to have the proper fine dense vertical porosity in the plate or plates preceding the final lead-tin or lead-tin-copper alloy plate. The lead alloy plate of thicknesses above about 0.3 mil has no dense fine vertical porosity, and besides being relatively soft, it is smeared over in bearing use. It also should be emphasized that the strength of the thin plate with the vertical porosity is far greater than porous sintered powder plate would be of the same metal in the same thicknesses.

Another way in which the processes of this invention may be carried out is as follows:

A very thin steel, brass, or aluminum alloy backing may be plated and used in strip form and secured in the connecting rod. In the case of the steel backing or aluminum alloy backing, a nickel, copper, or brass strike is preferably deposited on the front and back in a thickness of about 0.02 to about 0.2 mil. The first plate deposited on the strike plat of nickel, copper, or copper alloy may be copper containing densely codeposited fine barium sulfate or strontium sulfate particles or codeposited Saran or PVC particles or a mixture of these particles. This codeposition of copper with the non-metallic particles is preferably done from an air agitated acidic copper sulfate bath containing tetraethylene pentamine (about 0.1 to 0.2 grams/liter) or EDTA (10 grams/liter) as addition agents to promote the codeposition of the dispersed particles. After the electrodeposition of 0.1 to about 1 mil, preferably 0.2 to about 0.5 mil of such plate, an electroplate of preferably brass, silver or nickel is deposited with good bond on top of this composite copper plate containing the densely codeposited non-metallic particles. This latter plate may be less than about 0.5 mil thickness, and preferably 0.1 to about 0.3 mil thickness, and may also contain the same or similar types of codeposited non-metallic particles as described above. Then the final overlay plate of an essentially lead-tin alloy is deposited, usually in a thickness of about 0.3 to about 2 mils but preferably in a thickness of about 0.5 to 1 mil and to the finished size. For thrust bearings, the final overlay lead-tin plate may be only about 0.2 to 0.5 mil thickness, but with sleeve bearings for connecting rods and main bearings of gasoline or diesel engines, about 0.5 to 1 mil thicknesses are preferable. Plating on continuous strip can easily be done with thin steel backing or thin gauge strong aluminum alloy or brass strip.

In the usual sequence for the manufacture of standard insert bearings consisting of steel backed copper-lead "alloy" bearing material with a lead-tin alloy overlay electroplate, the copper-lead alloy layer is formed by sintering the pre-"alloyed" powder and rolling to bond the bearing layer to the steel backing. Then, after cutting the blanks, forming into half-shells, and machining to a correct undersize, thin "barrier" plate of nickel or brass is then electrodeposited followed by the final overlay plate of lead-tin or lead-tin-copper of about 1 mil thickness.

In comparison with the above, the use of the novel types and sequences of electrodeposits of this invention does not require the more intricate and expensive copper-lead "alloy" or aluminum-tin alloy bearing underlayer to the final lead alloy overlay electroplate. Furthermore, it is more difficult to obtain the best bond of a thin barrier layer of nickel or brass or of the final lead alloy electroplate to these particular alloy bearing underlayers. Thus, by using the novel electrodeposited sequence of plates of this invention, it is possible in many cases to eliminate the need for the copper-lead or aluminum-tin underlying bearing layer bonded to the steel backing, and to use instead a simpler aluminum alloy or brass or copper layer or purposes of high heat conductivity and for accurate machining to a finished undersize for the novel electroplates of this invention and the final lead-tin alloy overlay plate.

While the novel electroplates of this invention may be a two layered thin plate or a three or more (copper, nickel, cobalt, silver, brass) layered thin plate, they are essentially a duplex plate comprising one or more plates containing densely codeposited fine non-metallic particles followed by one or more relatively high strength electroplates, the latter in a total thickness less than 0.5 mil and containing dense vertical fine pores. Additionally, the final lead-tin alloy overlayer may be deposited in two steps, for example, a first step of about 0.5 mil lead-tin-copper alloy plate of approximately 90–8–2 composition, followed by about 0.5 mil of lead-tin plate of about a 90–10 composition. The resulting entire overlay plate is, however, essentially a lead-tin alloy plate with the small percentage of copper present causing an increase in hardness of the relatively soft plate.

Moreover, with the use of addition agents such as coumarin and lignin sulfonate, the lead-tin alloy plate may also be hardened to a certain extent, though it still is a soft low strength plate. The co-deposition of especially fine barium sulfate or strontium sulfate particles with the lead-tin alloy plate also desirably hardens the lead-tin alloy plate to a certain extent and at the same time aids in anti-scoring by competing as lubricating particles with any embedded dust or fine dirt particles. These types of particles also aid lubrication and anti-seizing when codeposited, as previously described, in the underlayers with the relatively higher strength metals such as silver and brass and especially with the non-bearing metals, nickel, cobalt and iron, since these latter metals do not have the lubrication properties of lead, lead-tin or lead-tin-copper alloy plates, or for that matter, of silver or brass or leaded brass plates. The lead alloy plates have conformability and, as already mentioned can embed dust and fine dirt particles and thus prevent scoring of the crankshaft journals or other journals, and in this respect can be improved by codepositing especially the fine barium sulfate or strontium sulfate particles with the lead alloy plate.

In general, the codeposited fine non-metallic particles are of about 0.1 to 5 microns size for barium and strontium sulfates, mica and talc, though these and other similar particles often codeposit on vertical surfaces as agglomerates of particles up to about 10 microns size. In the case of Saran particles, it is easy to densely codeposit on vertical surfaces, particles of 10 to at least 40 microns size. If the bearings are to operate at temperatures higher than about 300° F, it is in general preferred to use inorganic particles instead of organic particles in the codeposition though many organic particles may still be suitable. Additionally, when additives such as o-benzoyl sulfimide, benzene sulfonamide, benzene disulfonic acid are used in the nickel and cobalt plating baths to obtain finer grained plate, there will be present about 0.03 percent sulfur as molecular nickel or cobalt sulfide in the plate which can cause embrittlement if the latter is subjected to temperatures of about 400° F and over. In such cases, sulfur-free additives for obtaining finer grain plate such as coumarin, chloral hydrate and formaldehyde, used in small concentrations (about 0.2 gram/liter and less), may be used instead, as there is then no embrittlement with high temperatures. For acidic copper baths, the brightening and grain refining additives described in U.S. Pat. No. 2,707,166 or U.S. Pat. No. 3,288,690 may be used.

If the steel backing is to be plated directly with the duplex electroplate of this invention, it is preferred to use copper plate containing the densely codeposited fine non-metallic particles as the main undercoating of the duplex plate. The copper plate may be about 0.5 to at least 2 mils thick, with all or practically all of the copper plate containing the codeposited fine particles, or 0.2 to about 0.5 mil of the total copper plate may be the top portion containing the densely codeposited fine non-metallic particles. That is, a substantial portion of the copper plate may be straight ductile copper electroplate, while, with its high heat conductivity, is important to prevent or insure against localized hot spots in the upper and final bearing metal layer, the lead alloy plate, which is a comparatively poor heat conductor. If a bimetal strip is used, however, and a copper or aluminum layer is against the steel backing, a high heat conducting layer is already present and one can proceed with the thin duplex electroplate of copper, nickel, cobalt, etc. containing the densely codeposited fine non-metallic particles, with nickel or copper generally preferred in a thickness of about 0.1 to 0.5 mil followed by nickel in a thickness of about 0.1 to 0.2 mil or 0.3 mil as final plate of the duplex, or of 0.1 to about 0.3 mil brass or 0.1 to about 0.2 nickel and 0.1 to about 0.2 mil of brass, followed by the final lead alloy overlay plate. Also, while nickel and brass are preferred for the second layer of the duplex, iron, cobalt or silver, or 0.1 to 0.2 mil cobalt and 0.1 mil brass, or the like, may also be used with excellent results. For bronze, copper-cadmium alloys or copper, as the final layer of the duplex, a thin barrier plate of nickel or brass would be used in most cases to prevent the diffusion of tin downward from the lead-tin final overlay plate. Silver also is an extremely good bearing material, especially when fine particulate lead is distributed in its matrix. To use the least amount of silver, however, because of its cost, the second layer of the duplex plate may be a thin double or triple plate like nickel + silver plates, nickel + silver + nickel plates, cobalt + silver plates, nickel + silver + brass plates, or the like. The total thickness of these multiple plates constituting the second layer of the duplex (the layer with dense fine vertical pores), is, in general, less than about 0.5 mil.

Figure 2:
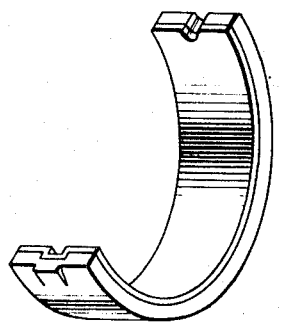
Figure 3:
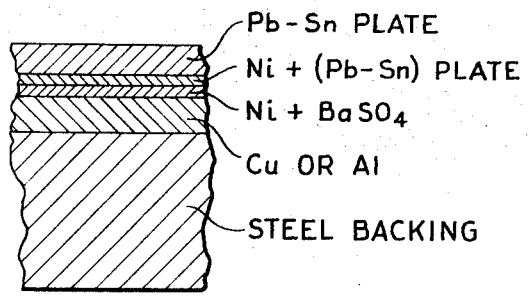
Figure 4:
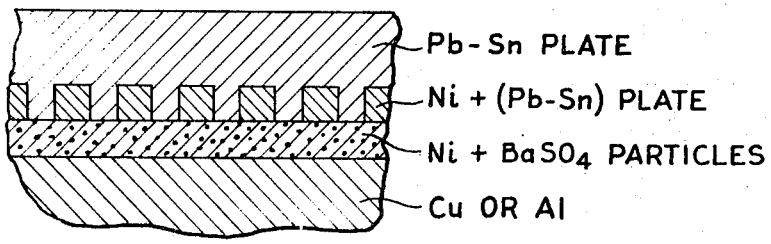

In the accompanying drawing which illustrates a specific and suitable embodiment of the present invention, FIG. 1 is the large end of a connecting rod for an internal combustion engine, with a positioned steel backed bearing composed of two half shells as shown in FIG. 2, tightly snapped in plate. FIG. 3 and FIG. 4 show an enlarged cross-section of the steel backed bearing and the top electroplated layers, respectively. The steel backing is usually the thickest member and, as is shown in the drawings, is followed by a highly heat conducting copper or aluminum layer that, desirably, is at least about 2 mils thick after the final machining and is undersized 1.4 mils to provide the correct space for the precision plated layers of nickel of 0.2 mil thickness containing densely codeposited fine particles of barium sulfate of about 0.05 to 5 microns size, followed by nickel plate of 0.2 mil thickness which has a dense fine vertical porosity of about 1,000 to at least 200,000 pores per sq. inch by virtue of being deposited on top of the nickel containing the densely codeposited fine barium sulfate insulator particles. Finally a mil overlay plate of lead-tin 90–10 ) is deposited on top of the highly porous nickel plate. As shown in FIG. 4 the lead-tin plate will throw into the pores of this underplate forming a nickel plate with dense fine particulate lead-tin alloy in its matrix, in essence a nickel-(lead-tin) "alloy" plate as an underlayer to the final lead-tin alloy plate. It is to be understood that the relative thicknesses of the various parts of the bearing as illustrated in the drawing are not accurate, and are only for the purpose of illustration of a bearing having a two inch bore therein, and a total wall thickness of the composite bearing shell of about 0.1 inch. It should also be emphasized that the drawings are merely exemplary of the present invention and the manner in which it may be practiced and are not to be taken as a limitation thereof. For example, the total wall thickness may be considerably less than 0.1 in., and when very thin, then other devices may be used to hold the bearing firmly in place in the connecting rod. Also, the number of fine vertical pores may be as high as at least 1 million pores per sq. inch, and the final overlay electroplate may be a lead-tin-copper alloy or a mixed lead alloy plate of the latter and the lead-tin alloy. Additionally, instead of nickel with densely codeposited fine particles of barium sulfate, the plate may be copper with the codeposited particles and a thickness of 0.3 mil, and the subsequent plate may be brass in thickness of 0.1 to 0.2 mil, or nickel in thicknesses of 0.1 to 0.2 mil followed by brass in thicknesses of 0.1 to 0.2 mil. With the slightly thicker plate, the correct undersize before plating is of course determined.

Some preferred duplex electroplates of this invention are further illustrated in the examples given below for manufacture of precision high strength thin walled half-round sleeve bearings with a standard steel backing of the general type shown in FIGS. 1, 2, 3, and 4. The final lead-alloy layer is precision electroplated to a thickness of 1 mil in these examples, whereas on other types of sleeve bearings, or thrust washers, wear plates, and the like, the thickness of the lead alloy plate may be from about 0.2 mil to even about 5 mils. On the other hand, the upper portion of the precision plated duplex layer of this invention is usually not over about 0.5 mil thickness when the codeposited particles are inorganic, though when the larger organic resin particles are used, for example 10–50 micron diameter particles, then the upper portion of the duplex may be at least 1 mil thick and even up to 2 mils (50 microns) in thickness.

The presence of a high heat conducting layer underneath the duplex electroplates of this invention and/or the use of copper or silver in the high strength duplex electroplate can make possible the carrying of extremely high peak loads without fatigue or other serious deterioration and may make possible the use of smaller bearing areas that remain stable, thus reducing bearing friction.

EXAMPLE 1

A standard bimetal strip consisting of a steel backing with an aluminum or aluminum alloy layer is cut into the proper size coupons, pressed into half-shells, and precision machined to 1.4 mil undersize on the concave side. The clean half-round sleeve bearings are placed in box-type plating racks of the type described in British Pat. No. 1,056,723, Jan. 25, 1967 further cleaned and given a treatment to ensure good bond of the subsequent electroplates to the aluminum. This treatment is the well-known zincate immersion treatment followed by a copper or a brass strike from slightly warm (room temperature to about 115° F), low alkalinity (pH about 10.5) cyanide baths, or low alkalinity nickel baths of pH about 6.5 to about 10. The sleeves are then plated with the final electroplated liners as follows. Nickel is electroplated to 0.2 mil thickness containing densely codeposited barium sulfate particles. This plate is obtained from an acidic nickel plating bath of the Watts type containing about 150 grams per liter of fine X-ray grade barium sulfate particles dispersed in the bath by air agitation. This bath may have 0.1 grams/liter of chloral hydrate and formalin present to obtain finer grained plate. Then the rack is transferred to another Watts bath and 0.2 mil of nickel is again deposited. Then the final lead alloy electroplate of 1 mil thickness is applied, preferably from an acidic fluoborate bath. The lead alloy may be about 90 lead–10 tin or 90 lead–8 tin–2 copper. It also may desirably contain codeposited barium sulfate particles by dispersing about 100–150 grams/liter of the particles by means of moderate stirring or pumping devices in the acidic lead alloy fluoborate bath. Finally the entire bearing insert may be given a flash of tin or lead-tin alloy plate for the sake of uniform appearance and protection of the steel backing from corrosion by high humidity during storage.

The aluminum alloy strip can be (4 percent Si, 1 percent Cd, balance Al), or (3–Cd, 1–Cu, 1–Ni, balance Al) or (6–Sn, 1–Cu, 1–Si, balance Al), or (11–Si, 1–Cu, 1–Mg, 1–Ni, balance Al), or similar aluminum alloys.

Instead of barium sulfate, Saran particles may be densely codeposited with the first nickel plate, and the first nickel plate may be 0.1 to about 1 mil thick, and is then followed by a nickel, cobalt, or alloy plate, that is, about 0.1 to even about 2 mils thick depending on pre-determined exact undersize in the precision machining operation. In this second nickel or cobalt plate it is preferred to have barium sulfate or strontium sulfate codeposited in the upper layer. This is because large particles of Saran, up to 50 microns (2 mils) in diameter can readily be densely codeposited on vertical cathodes with nickel, copper, cobalt, iron or their alloys. With these large particles, the upper layer continues to be highly porous even up to at least 2 mils in thickness. Also it is possible to dissolve out the Saran particles after the second layer is deposited by means of such solvents as methyl ethyl ketone or cyclohexanone, and then deposit the lead-tin alloy plate. In this case the lead alloy plates "throw in" deeper into the vertical pores than when insulator particles are at the bottom of the pores.

The Saran powder (Dow Chemical Co. Saran F–120 and Saran F–220 grades), a copolymer of vinylidene chloride and acrylonitrile codeposits with nickel in the highest volume percent on vertical cathodes of any non-metallic powder studied (see U.S. Pat. No. 3,356,467 issued Dec. 5, 1967). Also as mentioned, the largest particles, up to at least 50 micron diameters of this resin can be readily codeposited with nickel. Saran F–120 codeposits somewhat more readily in acidic nickel baths such as the Watts and high chloride types than the Saran F–220 grade, whereas, in acid copper sulfate solutions the reverse is true. A concentration of 50 to about 150 grams/liter of the Saran powder allows maximum codeposition on vertical cathodes. In the acid copper sulfate and fluoborate baths, and especially with the former, the use of about 0.1 to about 1 gram/liter of tetraethylene penta-amine or 10–15 grams/liter of ethylene diamine tetra-acetic acid (EDTA) or similar chelating agent allows maximum codeposition of Saran but even more so of barium of strontium sulfate, mica, talc and other similar inorganic particles. The alkaline copper pyrophosphate baths are excellent for dense codeposition of barium or strontium sulfate, but are not nearly as effective for codeposition of Saran particles as the acid copper baths. Thus for the codeposition of barium sulfate, the alkaline copper pyrophosphate bath has certain advantages over the acid copper baths in that no immersion copper plate or attack of the steel backing will occur even if it does not have a preliminary thin protective layer of copper, nickel or tin plate. Nevertheless, a thin plate of nickel on the entire steel strip or bimetal strip prior to the electrodeposition steps can nullify this problem with acid copper plating baths.

EXAMPLE 2

A bimetal strip consisting of a standard steel backing with a copper or copper alloy layer is cut and precision machined into the proper size half-shells and to 1.6 mils undersize on the concave side. The strip can best be given a copper strike to protect the steel backing during subsequent plating if the acid copper baths are used instead of alkaline pyrophosphate copper baths. The clean half-round sleeve bearings are placed in box-type plating racks and after further cleaning, rinsing and acid dip, the electroplates of this invention are applied. A copper plate with densely codeposited barium sulfate particles is electrodeposited in a thickness of 0.2–0.3 mil. This composite is electrodeposited from either an acid copper sulfate bath containing 100–150 grams/liter of X-Ray grade barium sulfate powder of 0.05 to about 5 micron size particles, and also containing 0.5 grams/liter of tetraethylene penta-amine to cause maximum codeposition, or from an alkaline copper pyrophosphate bath. It is then followed by 0.1 mil of cobalt plate containing densely codeposited barium sulfate particles or 0.1 mil of brass plate. Then the final lead-tin alloy plate is deposited in a thickness of 1 mil. The determination of the exact undersize precision machining will depend, of course, on the thickness of the total electroplates to be precision deposited.

Thin (0.1 to about 0.3 mil) electrodeposits constituting the duplex electroplates of this invention have been mainly described because with short plating time there is greater economy in the production of the bearing liners, and also the exact thicknesses of plate can be more precisely controlled. Nevertheless, it should be emphasized that much thicker deposits for the upper layer of the duplex may be used when 50 microns (2 mils) particle size of organic resins such as Saran and PVC are used in the dense codeposition of the underlayer of the duplex plate. With the 40 to 50 microns particle size of Saran, as previously pointed out, at least 2 mils of plate is necessary to completely or almost completely cover these larger particles held on the surface of the underlayer. In fact, at the end of even 5 mils of plate, the upper layer is still very porous when such large organic particles are codeposited in the underlayer and a solvent is used to dissolve out the organic resin particles. With Saran particles of about 0.1 to 2 microns size, then the much thinner plates can be employed without the use of a solvent to achieve porosity in the upper layer, as is done with the fine inorganic particles such as those of barium of strontium sulfates. With the larger size particles (about 10 to at least 50 microns) of organic resins such as Saran, PVC, or polystyrene, or the like, densely codeposited with copper, nickel, cobalt, iron or their alloys, it is not even necessary to deposit a second layer to obtain a highly porous layer in the manner already described. It merely suffices to dissolve out or vaporize or depolymerize the resin embedded in the surface of the plate, and then after cleaning, proceed with the lead-tin alloy plate. In this case, the "duplex" layer of this invention is a single layer with a duplex structure, the bottom portion of the plate is a composite and the top part is the porous part. If the underlayer to the lead alloy plate is copper or a copper alloy. a preliminary thin barrier plate of nickel, cobalt, iron or their alloys or a brass plate is used prior to the final lead alloy plate.

Finally it should again be emphasized that barium sulfate particles are lubricating particles, and have been used as such in drilling muds. Thus the relatively high strength metals with the densely codeposited barium sulfate particles have far less seizing tendencies than otherwise.

In the case of Teflon particles it is desirable to have present in the plating bath a perfluoro organic surfactant such as perfluorooctyl sulfonic acid or a salt of the latter to cause wetting of the fluorocarbon resin and allow codeposition of the Teflon particles. Teflon and similar fluorocarbon resins are, however, very poortly wetted by hydrocarbon lubricating oils, and also it is rather difficult to obtain dense codeposition on vertical cathodes of these particles compared to Saran, PVC, barium sulfate and strontium sulfate particles.

With the lower softening point organic resin particles, especially Saran, it is preferred not to use plating bath temperatures much higher than about 130°–140°F during the codeposition because the dispersed particles in the baths may tend to stick together.

Besides the use of electrodeposited bearing material of this invention in the shell type bearings, especially the thin walled, steel backed half-round precision plated bearings, thrust washers, and wear plates, the use of plastic gears and the like, offers unique possibilities because with electroplating from aqueous baths, no high temperatures are involved in depositing the bearing material. The progress in plating on plastics with good adhesion is already at a stage, where after the surface of the plastic, such as Nylon, PVC, or the like, has been given an adherent pre-plate, it may now be plated with the bearing material of this invention, and with the final lead alloy electroplate of 0.2 to about 5 mils thickness for such applications as gears that would require no lubrication, or at least minimal lubrication. Furthermore, selective plating on plastics is possible, and it would be possible to just plate the gear teeth, for example, instead of the entire gear.

What is claimed is:

1. A bearing material comprising an electrodeposited metallic layer having a thickness of from about 0.2 mil to about 5 mils thickness comprising at least one metal selected from copper, silver, nickel, cobalt, iron and their alloys and comprised of a lower portion containing densely codeposited non-metallic particles, an upper portion containing dense fine vertical porosity, and a final overlay electroplate on said porous portion comprised of a lead-tin alloy deposit of a thickness from about 0.2 to about 5 mils.

2. The bearing material as claimed in claim 1 wherein the electro-deposited metallic layer is comprised of at least one electroplate selected from copper, nickel, cobalt, iron and alloys thereof in which at least one of said electroplates is less than about 2 mils thick and contains densely codeposited fine non-metallic particles and is followed by an adherent contiguous metallic layer of less than about 0.5 mil thickness comprised of at least one electroplate selected from silver, copper, nickel, cobalt, iron and alloys thereof and wherein said contiguous layer has dense fine vertical porosity by virtue of having been deposited on the layer containing densely codeposited fine non-metallic particles, and said layer containing the dense vertical fine porosity is overlaid with the adherent lead-tin alloy deposit of a thickness between about 0.2 to about 5 mils thick.

3. The bearing material as claimed in claim 2 wherein the densely codeposited fine non-metallic particles are selected from barium sulfate and strontium sulfate of a particle size in the range of about 0.05 to about 10 microns.

4. The bearing material as claimed in claim 2 wherein the densely codeposited fine non-metallic particles are selected from Saran and PVC of a particle size in the range of about 0.05 to about 50 microns.

5. The bearing material as claimed in claim 3 wherein a copper electroplate of about 0.1 to about 0.5 mil thickness containing densely codeposited fine barium sulfate is plated with about 0.1 to about 0.2 mil nickel plate and the latter is plated with about 0.5 to about 1 mil lead alloy plate containing about 5 to about 10 percent tin and 0 to about 3 percent copper.

6. The bearing material as characterized in claim 3 wherein a nickel electroplate of about 0.1 to about 0.5 mil thickness containing densely codeposited fine barium sulfate particles is plated with about 0.1 to about 0.3 mil nickel plate and the latter is plated with about 0.5 to about 1 mil lead alloy plate containing about 5 to 10 percent tin and 0 to about 3 percent copper.

7. The bearing material as claimed in claim 3 wherein a copper electroplate of about 0.1 to about 0.5 mil thickness containing densely codeposited fine barium sulfate particles is plated with about 0.1 to about 0.2 mil of copper plate which is followed by about 0.1 mil of nickel plate which is followed by a lead alloy plate of about 0.5 to about 1 mil thickness containing about 5 to 10 percent tin and 0 to about 3 percent copper.

8. The bearing material as claimed in claim 5 wherein an added plate selected from brass and silver plates of about 0.1 mil thickness precedes the lead-tin alloy plate.

9. The bearing material as claimed in claim 6 wherein an added plate selected from brass and silver plates of about 0.1 mil thickness precedes the lead-tin alloy plate.

10. The bearing material as claimed in claim 7 wherein an added plate selected from brass and silver plates of about 0.1 mil thickness precedes the lead-tin alloy plate.

11. The bearing material as claimed in claim 1, wherein the metallic layer preceding the final lead-tin alloy plate, is a copper electroplate containing in its lower portion densely codeposited Saran particles and containing in its upper portion dense porosity by virtue of solvent extraction of the Saran particles that were codeposited in the surface of the said copper plate.

12. The bearing material as claimed in claim 11, wherein an anti-diffusion barrier plate selected from nickel, cobalt and brass precedes the final lead-tin alloy plate.

13. The bearing material as claimed in claim 1 wherein the final lead-tin alloy electroplate contains densely codeposited particles selected from barium and strontium sulfates.

14. A shell type bearing comprising a metal backing member, and containing the bearing liner material as claimed in claim 1.

15. A shell type bearing comprising a steel backing having bonded thereto a non-ferrous highly heat conducting metallic layer selected from silver, copper, aluminum and alloys thereof, and a bearing material as claimed in claim 2 bonded to the surface of said heat conducting layer.

16. A thin walled bearing shell comprised of a steel back having a non-ferrous highly heat conducting metallic layer bonded to the concave surface thereof, and a bearing material as claimed in claim 2 bonded to the surface of said heat conducting layer.

* * * * *